United States Patent
Fabian et al.

(10) Patent No.: US 7,438,869 B1
(45) Date of Patent: Oct. 21, 2008

(54) EMISSION CONTROL SYSTEM

(75) Inventors: Lutz Fabian, Dresden (DE); Gunter Krodel, Dresden (DE); Dietmar Resch, Dresden (DE); Hort Stelzer, Dresden (DE)

(73) Assignee: Centrotherm Clean Solutions GmbH + Co. KG, Blaubeuren (DE)

( * ) Notice: Subject to any disclaimer, the term of this patent is extended or adjusted under 35 U.S.C. 154(b) by 0 days.

(21) Appl. No.: 10/018,116

(22) PCT Filed: May 15, 2000

(86) PCT No.: PCT/DE00/01576

§ 371 (c)(1),
(2), (4) Date: Apr. 19, 2002

(87) PCT Pub. No.: WO00/77452

PCT Pub. Date: Dec. 21, 2000

(30) Foreign Application Priority Data

Jun. 16, 1999 (DE) .................. 199 27 540

(51) Int. Cl.
*B01J 19/08* (2006.01)
(52) U.S. Cl. .................. 422/186.03; 422/186.04; 422/168
(58) Field of Classification Search ............... 422/174, 422/182; 55/228; 588/210, 211; 261/151, 261/78.1
See application file for complete search history.

(56) References Cited

U.S. PATENT DOCUMENTS

| | | | |
|---|---|---|---|
| 4,644,877 A | 2/1987 | Barton et al. ............... | 110/250 |
| 4,878,839 A | 11/1989 | Wunning ...................... | 432/72 |
| 5,364,665 A | 11/1994 | Felts et al. .................. | 427/571 |
| 5,387,775 A | 2/1995 | Kang .......................... | 219/121 |
| 5,750,823 A * | 5/1998 | Wofford et al. ............. | 423/210 |
| 5,907,077 A | 5/1999 | Harashima .................. | 588/210 |

FOREIGN PATENT DOCUMENTS

| DE | 4428418 | 2/1996 |
|---|---|---|
| EP | 0821995 | 2/1998 |
| GB | 2279447 | 1/1995 |

\* cited by examiner

*Primary Examiner*—Glenn Caldarola
*Assistant Examiner*—Tom Duong
(74) *Attorney, Agent, or Firm*—Baker Botts L.L.P.

(57) ABSTRACT

The invention relates to an emission control system for removing environmentally harmful and/or toxic gases or vapors, comprising a reaction chamber which is connected to a plasma source, whereby plasma is formed in said reaction chamber by injecting excitation energy, and the reaction chamber and/or the plasma source has at least one inlet for the introduction of gases or vapors and one outlet for the gases or vapors which are treated in the plasma source and/or reaction chamber. According to the invention, the outlet of the reaction chamber is connected to a liquid jet pump which produces a low pressure in the reaction chamber and in the plasma source. The waste gases with the plasma or the waste gases which are treated by excited particles are jointly conducted along with the liquid which is circulated through the liquid jet pump, mixed therewith and discharged from said reaction chamber.

20 Claims, 1 Drawing Sheet

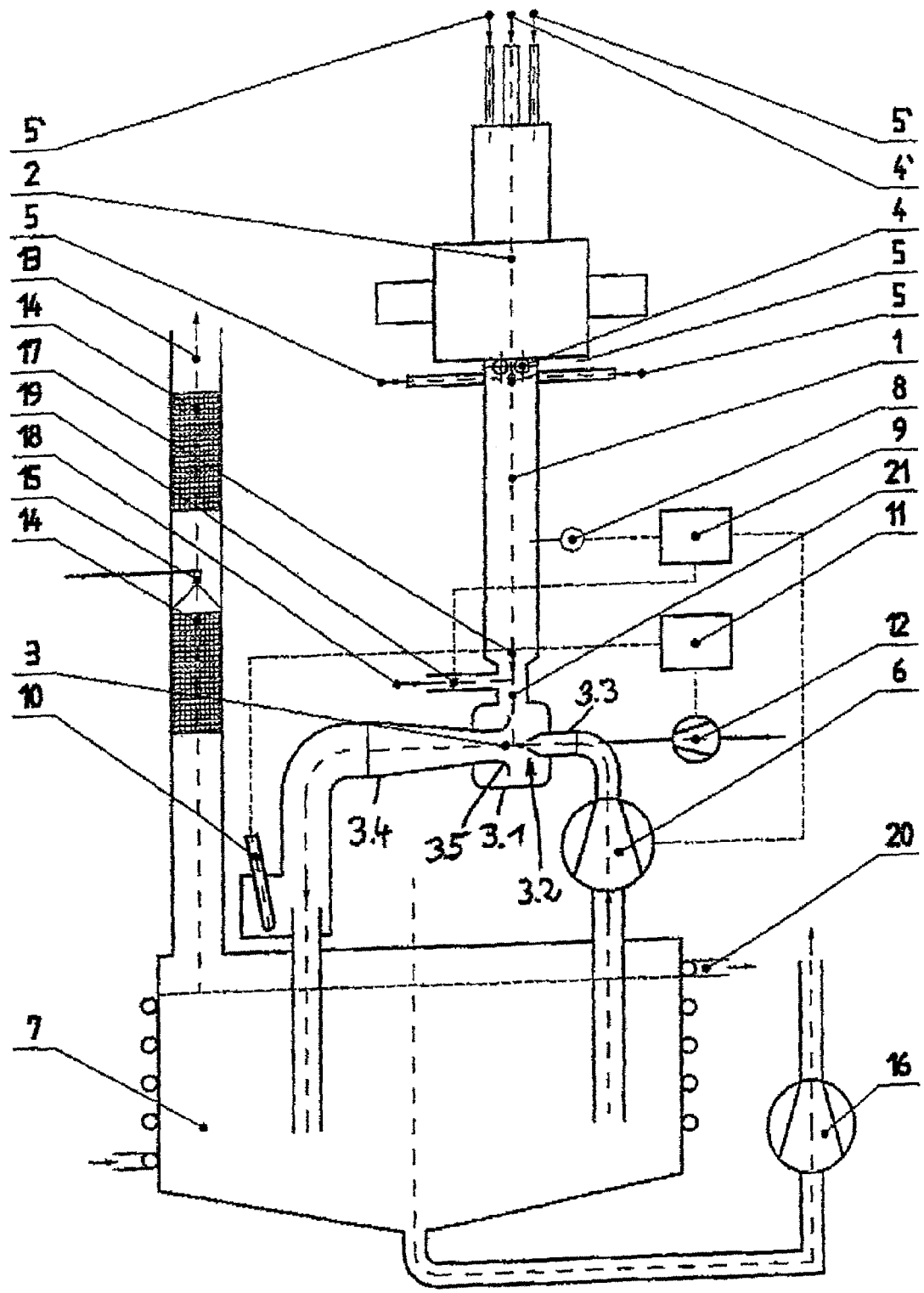

EMISSION CONTROL SYSTEM

BACKGROUND OF INVENTION

The invention relates to a waste gas cleaning system for the disposal of environmentally harmful and/or toxic gases or vapors having a reaction chamber that is connected with a plasma source in which a plasma is formed by coupled excitation energy, where the reaction chamber and/or the plasma source has at least one inlet for the feed of gases or vapors and the reaction chamber has an outlet for the gases or vapors treated in the plasma source and/or in the reaction chamber.

A variety of methods have been disclosed for cleaning environmentally harmful and/or toxic gases or vapors, such as for example waste gases coming from semiconductor manufacturing processes such as CVD, LP-CVD, plasma-CVD, plasma etching or similar processes. In the great majority of cases, methods in which the gases or vapors are burned and/or thermally decomposed are used. The thermally treated gases or vapors are then passed through a scrubber in which the solid and/or soluble reaction products are scrubbed out of the waste gases by means of a sorption medium.

Such a device for cleaning waste gases has been disclosed in WO 96/23173. This device contains a combustion chamber in which is arranged a burner and to which are fed burnable gas, oxygen or air and the process waste gas to be decomposed. Above the combustion chamber is located a scrubbing chamber with a spray nozzle for spraying the sorption medium. There the combustion chamber is located within an outer pipe and is limited by an inner pipe, the outer pipe also surrounding the scrubbing chamber that is located above the combustion chamber.

The reaction products produced in the combustion chamber are passed between the inner and the outer pipes into the scrubbing chamber and from there via an exhaust into the ambient air.

A wide variety of gases, such as for example, $SiH_4$, $PH_3$, $B_2H_6$, TEOS (tetraethoxysilane) from CVD processes, $C_2F_6$, $CF_4$, $CH_3F$, $Cl_2$, $BCl_3$ from dry etching processes and from other processes, can be disposed of with great effectiveness by such a waste gas cleaning system. A requirement is that in each instance, the parameters of the waste gas cleaning system be adapted to the type and quantity of the gases or vapors to be cleaned, so as to ensure that combustion or thermal decomposition takes place under excess oxygen.

In such waste gas cleaning systems, the relatively high operating costs and great consumption of media are disadvantageous. Also disadvantageous is that many different media (burnable gases, oxygen) are required and that fairly high installation costs are to be expected. In addition, the use of burnable gases requires special care.

In order to avoid these problems, it has been attempted to make use of low-pressure plasmas for waste gas disposal, such as, for example in EP-A-0,821 995, the use of a hollow cathode discharge has been proposed. There the disadvantage is that intervention in the vacuum system of the coating or etching system cannot be avoided, so that waste gas disposal may negatively influence the preceding semiconductor process. If this is to be avoided, an additional high-cost vacuum system and possibly a buffer chamber for the temporary storage of process waste gases would have to be provided.

The use of a plasma source that can work under atmospheric pressure would be more favorable. Such plasma sources are operated at an excitation frequency in the microwave range and are capable of generating a non-thermal (cold) plasma.

The use of such a plasma for the disposal of environmentally harmful or toxic compounds has already been proposed.

In this connection, the fact that the plasmas generated often become constricted is to be regarded as disadvantageous. In addition, the plasma volume obtainable is limited by screening effects. As a result, the quantity of disposable waste gas is also limited, so that the quantities of waste gas obtainable in conventional combination systems (burning/thermal decomposition and subsequent scrubbing) cannot be obtained. Therefore particular attention has to be paid to the generation of plasma, in order to avoid the disadvantageous effects listed above. However, even in the most careful design of the plasma source, it is necessary to reduce the pressure in the reaction chamber for ignition of the plasma to some 10 mbar. In addition, the fact that when working under normal pressure the most favorable plasma parameters for conversion of the gases or vapors are not always adjustable proves to be disadvantageous. Additionally, a scrubber is required to remove the harmful substances remaining in the plasma after conversion of the waste gas.

Therefore, the object of the invention is to provide a waste gas cleaning system in which use of a plasma source working even at atmospheric pressure permits effective and low-cost disposal of environmentally harmful or toxic gases or vapors.

SUMMARY OF THE INVENTION

The problem on which the invention is based is solved by a waste gas cleaning system of the type mentioned at the beginning in that the outlet of the reaction chamber is connected with a liquid jet, in that the liquid jet pump generates a negative pressure in the reaction chamber and in the plasma source, and in that the waste gases treated in the plasma or by excited particles are carried out of the reaction chamber together with the liquid carried through the pump, intermixed with the latter.

A negative pressure in the range of atmospheric pressure down to <100 mbar can be generated in the reaction chamber by use according to the invention of a liquid jet pump. At the same time, the harmful solid, gaseous and liquid substances still found in the waste gas stream after passage through the plasma are scrubbed out by the liquid jet.

Owing to the possibility of being able to vary the pressure in the reaction chamber over a broad range, the plasma may be ignited at low pressure, and the plasma conditions may be adapted so that decomposition of the gases or vapors to harmless waste gases is effected as fully as possible. In general, a reduction in pressure leads to an increase in plasma volume, but, on the other hand, the volume of waste gas is increased so that residence time is reduced.

Care should be taken to see that a plasma source is used that, owing to its structural features, is able to form as homogeneous as possible a large-volume plasma in the required pressure range and one that can be used in continuous operation. The waste gas to be treated can be conducted directly through the plasma of the plasma source or fed immediately behind the plasma source into the reaction chamber and treated by the particles excited in the plasma in the so-called remote plasma.

In development of the invention, the suction port of the liquid jet has a large cross section in order, on the one hand, to generate the required pumping capacity and, on the other, to prevent obstructions by solid constituents of the waste gas. This also results in especially thorough mixing of the liquid conducted through the liquid pump with the waste gas flowing out of the reaction chamber.

The negative pressure generated in the reaction chamber by the liquid jet lies in the range of <30 mbar to atmospheric pressure.

In order to prevent progressive heating of the liquid in the liquid circuit, a cooling system is used. As a result, the necessary negative pressure that is required, for example for ignition of the plasma, can always be generated by the jet pump in the plasma source and in the reaction chamber.

In an additional embodiment of the invention, the liquid jet is operated with a sorption medium, where the liquid jet is a part of a recirculating system for the sorption medium. In this way, media costs may be substantially reduced and the effectiveness of disposal increased.

The recirculating system additionally may have a controllable circulation pump for controlling delivery of the sorption agent, so that the negative pressure generated by the liquid jet can be controlled by controlling delivery of the sorption medium.

The circulation pump preferably is designed as a compressed air-driven diaphragm pump, since, on the one hand, large flow rate can be obtained and, on the other, long service life can be guaranteed.

Another possibility for the control of negative pressure consists in that secondary air can be drawn in at the inlet of the liquid jet and control of negative pressure can be effected by controlling the quantity of secondary air.

In an additional development of the invention, the reaction chamber and/or the plasma source may be provided with at least one feed for additional gases. Such additional gases may be oxygen and/or hydrogen, or water vapor, but alternatively other gases. An increase in the effectiveness of disposal can be obtained with these additional gases.

Plasma sources that work in the microwave range are preferred, since at relatively high pressures near atmospheric pressure, a non-equilibrium plasma (nonthermal plasma) can be generated on the basis of the very high excitation frequency of for example 2.45 GHz and the associated high field densities, where microwave power is at a level, for example, of 6 kW.

By non-equilibrium plasma is meant that a number of highly reactive or high-energy particles exist without the average temperature of the waste gas being excessively high. In this way, undesirable reactions, such as for example the formation of nitrogen oxides, are reduced.

Although it is sufficient to operate the liquid jet with clean water as sorption medium, it may in some cases be advisable to add certain substances in order to improve the effectiveness of scrubbing. For this reason, in an additional development of the invention there is provided after the jet pump a pH electrode, which is connected with a control that drives a metering pump for the metered addition of alkaline or acid solution into the liquid circuit. Thus, metered addition of a basic sorption medium is advantageous when for example acid gases (HF, HCl) are to be scrubbed.

An additional embodiment of the invention is characterized in that the liquid jet is connected with a reservoir for the sorption liquid and in that a suction line connects the reservoir with an exhaust for the cleaned waste gas.

It is additionally of advantage when at least one aerosol filter that retains solid and/or liquid aerosols in the waste gas is arranged in the exhaust line.

For a better understanding of the invention, together with other and further objects, reference is made to the following description, taken in conjunction with the accompanying drawings and its scope will be pointed out in the appended claims.

BRIEF DESCRIPTION OF THE DRAWINGS

The drawing represents a system in accordance with the present invention.

DESCRIPTION OF THE INVENTION

The waste gas cleaning system consists of a reaction chamber 1, arranged vertically, and is connected at its upper end with a plasma source 2. Plasma source 2 is arranged so that excited particles in the plasma source can be fed into the reaction chamber. A microwave source that works at a frequency of 2.45 GHz and is designed for a power of up to 6 kW is a possible plasma source 2.

The reaction chamber 1 in addition has at its upper end one or more inlets 4 for process gases or vapors to be disposed of, for example. process waste gases from semiconductor manufacturing processes, as well as one or more side inlets 5 for additional gas. Oxygen, hydrogen and water vapor, or a combination thereof, are possible additional gases. When the process gases or vapors and the additional gas are to be fed directly into the plasma source 2, the plasma source 2 should likewise be provided with one or more inlets 4' for the process gases or vapors and one or more inlets 5' for additional gas.

The lower end of the reaction chamber 1 is provided with an outlet 17, which is connected with the suction port 21 of a liquid jet 3. The liquid jet 3 is part of a recirculating system in which is arranged a circulation pump 6. The circulation pump 6 preferably is designed as a compressed air-driven diaphragm pump that draws the liquid used as sorption medium for the liquid, solid or soluble constituents of the waste gas from a reservoir 7 and delivers it to the jet pump 3.

Liquid jet pump 3 includes the following components: a housing 3.1 having a suction port 21, which is connected to reaction chamber 1; a constricted nozzle 3.2 disposed within housing 3.1, constricted nozzle 3.2 is an end of supply tube 3.3, which extends through the wall of housing 3.1 from circulation pump 6; and a drain-off tube 3.4 with an opening 3.5 opposite the constricted nozzle 3.2. Drain-off tube 3.4 extends through the wall of housing 3.1, and supply tube 3.3 and drain-off tube 3.4 extend into reservoir 7.

The pump 3 has the function of generating, in the reaction chamber 1 and in the plasma source 2, a negative pressure of some 10 mbar for ignition of the plasma and maintaining a negative pressure during treatment of the waste gas and, in addition, the task of pumping the waste gas treated in the plasma out of the reaction chamber 1. The magnitude of the negative pressure generated by the liquid jet 3 depends, on the one hand, on the size of the pump and, on the other, on the quantity of the gases fed in, the quantity of liquid pumped and the temperature of the liquid (vapor pressure). For this reason, it is advantageous to provide cooling of the liquid or the sorption medium in the liquid circuit. For this purpose, the reservoir 7 may be provided with a cooling system 20.

The pressure in the reaction chamber 1 is measured by a pressure sensor 8, whose electrical signal controls the circulation pump 6 via a control 9 so that the pressure in the reaction chamber 1 is controlled to an optimal value. A second possibility for pressure control consists in coupling the control 9 with a throttle valve 19 in a secondary air inlet 18, and adjusting the pressure to optimal values via the quantity of secondary air drawn in.

The sorption medium makes intensive contact in the liquid jet pump 3 with the waste gas that has already passed through the plasma, thereby removing solid and soluble constituents from the waste gas, and flows from the jet pump 3 back into the reservoir 7.

Located in this return flow is a pH electrode 10, which measures the pH of the sorption 4 liquid flowing past and via a control 11 controls a metering pump 12 by means of which alkaline or acid solution may be metered into the liquid circuit in order to keep the pH within a specified range.

The waste gas converted in the plasma in the reaction chamber 1 and treated in the liquid jet pump 3 with the sorption medium leaves the reservoir 7 via a suction line 13, which is connected with an exhaust.

One or more aerosol filters 14, which retain solid and/or liquid aerosols, are accommodated in the suction line 13. These aerosol filters 14 may be cleaned continuously or discontinuously by water and/or sorption medium injected via one or more spray nozzles 15. This water and/or sorption medium flows back into the reservoir 7, so that the quantity of sorption medium in the liquid circuit is steadily increased.

In order to avoid overflow, at the floor of the reservoir 7 the consumed sorption medium is drawn off together with solid particles by means of a pump 16.

A high degree of cleaning effectiveness for fluorocarbon compounds as well as other usual gases found in semiconductor manufacture, such as for example $SiH_4$, $PH_3$, $NF_3$ and $NH_3$, is obtained with the waste gas cleaning system described when it is operated in the pressure range of about 700 to 1000 mbar and a microwave power of up to about 6 kW. Water vapor, but alternatively oxygen and hydrogen, are fed in as additional gases. Caustic potash solution is used for neutralization of the acid gases (HF) produced in conversion of fluorocarbon compounds or NF.

The invention claimed is:

1. A waste gas cleaning system for removing harmful and/or toxic gases from a gas stream, comprising:
    a reaction chamber for treating and converting harmful and/or toxic gases for their removal and/or disposal, said reaction chamber having an inlet for receiving a gas stream to be treated and an outlet;
    a plasma source coupled to said reaction chamber for providing excitation energy to said reaction chamber for treating harmful and/or toxic gases for their removal and/or disposal and form a plasma therein; and
        a liquid jet pump having a suction tube or port connected to said reaction chamber outlet and generating sufficient negative pressure in said reaction chamber for generating a plasma therein, said liquid jet pump being arranged to draw treated harmful and/or toxic gases out of said reaction chamber mixed with liquid from said liquid jet, wherein the liquid jet pump has a constricted region having a lower pressure that is connected via said suction tube or port to said reaction chamber to provide vacuum drawing power or suction on said reaction chamber, wherein the liquid jet pump comprises:
    a housing having the suction port that is connected to reaction chamber;
    a constricted nozzle disposed within the housing, wherein the constricted nozzle is an end of supply tube that extends through a wall of housing and is configured to eject a horizontally directed liquid jet when the reaction chamber and the liquid pump are vertically aligned; and
    a liquid jet drain-off tube having an end opening disposed opposite the constricted nozzle to directly receive and drain the horizontally directed liquid jet ejected from the constricted nozzle.

2. A waste gas cleaning system as specified in claim 1 wherein said liquid jet pump has a larger cross-section than the cross-section of said outlet.

3. A waste gas cleaning system as specified in claim 1 wherein said liquid jet pump as arranged to generate negative pressure in the range of 30 mbar-100 mbar.

4. A waste gas cleaning system as specified in claim 3, wherein said liquid jet pump is provided with a sorption medium.

5. A waste gas cleaning system as specified in claim 4, wherein there is provided a recirculating system including said liquid jet for said sorption medium.

6. A waste gas cleaning system as specified in claim 5, wherein said recirculating system is provided with a cooling system.

7. A waste gas cleaning system as specified in claim 5 wherein said recirculating system includes a controllable circulation pump for controlling flow rate of the sorption medium.

8. A waste gas cleaning system as specified in claim 7, wherein said circulation pump is a compressed air-driven diaphragm pump.

9. A waste gas cleaning system according to any of claim 4 wherein said liquid jet pump is connected with a reservoir for the sorption medium and wherein a suction line connects said reservoir with an exhaust for the cleaned waste gas.

10. A waste gas cleaning system according to claim 9, wherein said suction line includes at least one aerosol filter.

11. A waste gas cleaning system as specified in any of claim 1 wherein there is provided a secondary air inlet to said reaction chamber and wherein said secondary air inlet is controlled to control said negative pressure in said reaction chamber.

12. A waste gas cleaning system according to any of claim 1 wherein there is provided at least one inlet for additional gases to at least one of said reaction chamber and said plasma source.

13. A waste gas cleaning system according to claim 12 wherein said at least one inlet for additional gas is connected with a source for one of oxygen and hydrogen.

14. A waste gas cleaning system according to claim 12, wherein said at least one inlet for additional gas is connected with a source for water vapor.

15. A waste gas cleaning system according to any of claim 1 wherein said plasma source provides a non-thermal plasma.

16. A waste gas cleaning system according to any of claim 1 wherein said plasma source has an excitation frequency in the microwave range.

17. A waste gas cleaning system according to claim 16, wherein said plasma source has an excitation frequency of 2.45 GHz.

18. A waste gas cleaning system according to claim 16 wherein said plasma source has a microwave power of up to 6 kW.

19. A waste gas cleaning system according to any of claim 1 wherein a pH electrode is arranged at an outlet at the liquid jet pump and wherein said pH electrode is connected with a control for a metering pump for providing a metered addition of one of alkaline and acid solution into the liquid jet.

20. A waste gas cleaning system for removing harmful and/or toxic gases from a gas stream, comprising:
    a reaction chamber for treating and converting harmful and/or toxic gases for their removal and/or disposal, said reaction chamber having an inlet for receiving a gas stream to be treated and an outlet;

a plasma source coupled to said reaction chamber for providing excitation energy to said reaction chamber for treating harmful and/or toxic gases for their removal and/or disposal, and form a plasma therein;

a liquid jet pump having a suction port connected to said reaction chamber outlet and generating negative pressure in said reaction chamber, wherein said liquid jet pump is arranged to draw treated harmful and/or toxic gases through said suction port out of said reaction chamber and mix said treated gases with liquid from said liquid jet, and is further arranged to generate a sufficient negative pressure in said reaction chamber for ignition of said plasma and to further arranged to maintain said sufficient negative pressure during plasma treatment of the received gas stream for removing harmful and/or toxic gases therefrom, wherein the liquid jet pump has a constricted region having a lower pressure that is connected via said suction tube or port to said reaction chamber to provide vacuum drawing power or suction on said reaction chamber wherein the liquid jet pump comprises:

a housing having the suction port that is connected to the reaction chamber;

a constricted nozzle disposed within the housing, wherein the constricted nozzle is an end of supply tube that extends through a wall of housing and is configured to eject a horizontally directed liquid jet when the reaction chamber and the liquid pump are vertically aligned; and a liquid jet drain-off tube having an end opening disposed opposite the constricted nozzle to directly receive and drain the horizontally directed liquid jet ejected from the constricted nozzle.

\* \* \* \* \*